(12) United States Patent
Vogt et al.

(10) Patent No.: US 12,551,617 B2
(45) Date of Patent: Feb. 17, 2026

(54) DEVICE, SYSTEM, AND METHOD FOR APPLYING A PHARMACEUTICAL FLUID

(71) Applicant: Heraeus Medical GmbH, Wehrheim (DE)

(72) Inventors: Sebastian Vogt, Wehrheim (DE); Thomas Kluge, Wehrheim (DE)

(73) Assignee: Heraeus Medical GmbH, Wehrheim (DE)

( * ) Notice: Subject to any disclaimer, the term of this patent is extended or adjusted under 35 U.S.C. 154(b) by 911 days.

(21) Appl. No.: 17/664,546

(22) Filed: May 23, 2022

(65) Prior Publication Data

US 2022/0379025 A1  Dec. 1, 2022

(30) Foreign Application Priority Data

May 28, 2021  (EP) ..................................... 21176434

(51) Int. Cl.
*A61M 5/168*  (2006.01)
*B21D 26/045*  (2011.01)

(52) U.S. Cl.
CPC ....... *A61M 5/16881* (2013.01); *B21D 26/045* (2013.01)

(58) Field of Classification Search
CPC .......... A61M 5/16881; A61M 25/0075; A61M 39/22; A61M 2039/242; A61M 2039/2473; A61M 39/24; A61F 5/4405; F16K 31/58; F16K 15/1472; B21D 26/045

See application file for complete search history.

(56) References Cited

U.S. PATENT DOCUMENTS

| | | | | |
|---|---|---|---|---|
| 4,360,019 A * | 11/1982 | Portner | ............. | A61M 5/14276 604/141 |
| 5,261,885 A * | 11/1993 | Lui | .................... | A61M 25/0075 604/266 |
| 5,826,621 A * | 10/1998 | Jemmott | ........... | A61M 5/16831 137/853 |
| 5,989,219 A * | 11/1999 | Villas | .................... | A61M 5/348 604/218 |
| 7,150,727 B2 * | 12/2006 | Cise | ...................... | A61M 5/142 604/246 |

FOREIGN PATENT DOCUMENTS

| | | |
|---|---|---|
| DE | 3334595 A1 | 4/1985 |
| DE | 3429038 A1 | 2/1986 |
| DE | 3203957 C2 | 12/1989 |
| DE | 9209164 U1 | 8/1992 |
| FR | 2707505 A1 | 1/1995 |
| WO | 9737714 A1 | 10/1997 |

* cited by examiner

*Primary Examiner* — Nilay J Shah
(74) *Attorney, Agent, or Firm* — Dicke, Billig & Czaja, PLLC

(57) ABSTRACT

The invention relates to a device for applying a pharmaceutical fluid, having a tube and a valve element, wherein the tube can be connected in terms of fluid conduction via a first tube end to a reservoir for the pharmaceutical fluid, and wherein the valve element is arranged in a second tube end of the tube. The invention furthermore relates to a system for applying a pharmaceutical fluid, having a reservoir for the pharmaceutical fluid and such a device, and to a method for applying a pharmaceutical fluid by means of such a device.

15 Claims, 6 Drawing Sheets

DEVICE, SYSTEM, AND METHOD FOR APPLYING A PHARMACEUTICAL FLUID

CROSS-REFERENCE TO RELATED APPLICATIONS

This application claims priority pursuant to 35 U.S.C. 119(a) to European Patent Application No. 21176434.5, filed May 28, 2021, which application is incorporated herein by reference in its entirety.

SUMMARY

The invention relates to a device for applying a pharmaceutical fluid, comprising a tube and a valve element, wherein the tube can be connected in terms of fluid conduction via a first tube end to a reservoir for the pharmaceutical fluid, and wherein the valve element is arranged in a second tube end of the tube.

The invention furthermore relates to a system for applying a pharmaceutical fluid, comprising a reservoir for the pharmaceutical fluid and such a device, and to a method for applying a pharmaceutical fluid by means of such a device.

The subject matter of the invention is in particular a medical device for temporary, local application of pharmaceutical fluids or other medical fluids over a time period of from hours up to several days.

BACKGROUND

The local application of pharmaceutical fluid, such as solutions with added antibiotics, has been known for decades and has proven successful in particular in the treatment or the alleviation of bone tissue infections. Distinctions can thereby be made between non-resorbable and resorbable or biodegradable active ingredient carriers. The introduction of fluids into hollow spaces for the purpose of flushing and disinfecting can, however, also be useful for disinfecting and cleaning medical implants and devices with hollow spaces that would otherwise be difficult to reach.

Resorbable and non-resorbable active ingredient carriers are known for the medical treatment of infections in hollow spaces and cavities that are hard to reach, such as bone cavities.

An example of non-resorbable active ingredient carriers are the bead chains known since 1977 under the trade name Septopal®. These consist of polymethyl methacrylate beads which contain the broad spectrum antibiotic gentamicin sulfate, wherein these beads are arranged in a chain on steel thread (K. Klemm: Gentamicin-PMMA beads in treating bone and soft tissue infections. Zentralbl. [Central Journal] Chir. [Surgery] 104(14) (1979) 934-942; K. Klemm: Antibiotic bead chains. Clin. Orthop. 295 (1993) 63-76). This chain-shaped active ingredient carrier (Septopal®)) has proven successful for decades in the local antibiotic treatment of osteomyelitis. It is thereby advantageous that the gentamicin sulfate is released in larger quantities from the active ingredient carrier over a time period of several days. It is furthermore advantageous that the chain-shaped active ingredient carrier can be adapted unproblematically by the medical user to the anatomical situation at the implantation site by simply cutting off the steel thread with surplus beads. It is disadvantageous that the active ingredient carrier contains exclusively gentamicin sulfate, and that the medical user cannot modify the active ingredient carrier with further antibiotics corresponding to the sensitivity of the microbial germs. In addition, once the bead chain has been implanted, the delivery of the active pharmaceutical ingredient can no longer be adapted to the course of the treatment without exchanging the bead chain. In particular, the successful local treatment of infections with problematic germs, such as MRSA and VRSA, is thereby only possible to a limited extent or not at all. The removal of the bead chains after successful active ingredient release is linked with considerable stress for the patient due to intergrowth with connective tissue.

Examples of resorbable or biodegradable active ingredient carriers are non-wovens and sponges made of collagen or gelatin. By way of example, the publications DE 34 29 038 A1, DE 33 34 595 A1, DE 28 43 963 C2, DE 32 03 957 C2, and DE 33 34 595 A1 are cited in this respect. These carriers contain gentamicin sulfate or mixtures of gentamicin sulfate and a gentamicin salt that is slightly soluble in water. Furthermore, there are a plurality of resorbable or biodegradable active ingredient carriers based on tricalcium phosphate, hydroxylapatite, gypsum, and mixtures thereof, as well as composite materials made from these salts and organic binders. An overview has been published by Kühn et al. (K. D. Kühn, N. Renz, A. Trampuz: Lokale Antibiotika-Therapie [Local Antibiotic Therapy]. Der Unfallchirurg [The Traumatologist]. 120 (2017) 561-572).

The disadvantage of the mentioned non-resorbable active ingredient carriers, and also of the resorbable or biodegradable active ingredient carriers, is that the antimicrobial active ingredient is defined by the selected composition and that, after implantation of the active ingredient carrier, the active ingredient can no longer be exchanged or supplemented with other active ingredients. Furthermore, the active ingredient release in all previous local active ingredient release systems is subject to the principle of diffusion, so that large quantities of active ingredient are released only in the first hours or at most first days. An exception is the use of active ingredient salts that are slightly soluble in water, given which the active ingredient release depends on the solubility equilibrium of the active ingredient salts.

Therefore, a device is desirable that allows a local application of arbitrary active pharmaceutical ingredients in the form of pharmaceutical fluids, and wherein it is possible at any time to exchange the composition and/or the concentration of active ingredients in the pharmaceutical fluid. Moreover, it is desirable that the active ingredient concentration in the pharmaceutical fluid that is achieved immediately at the implantation site be adjustable directly from the outside.

EP 1 932 560 B1 discloses a catheter for applying a pharmaceutical fluid. The catheter has a tube which, at its distal tube end, has a plurality of openings through which the fluid can be applied from the interior of the tube. Further similar catheters are known from U.S. Pat. No. 5,800,407 A1, U.S. Pat. No. 6,537,194 A1, and U.S. Pat. No. 5,425,723 A1. These catheters have the disadvantage that an application of the pharmaceutical fluid is possible only over a large area and in relatively large quantities. A locally limited release of small volumes of pharmaceutical fluids, in a range from a few microliters up to a few milliliters, for example up to two milliliters, is not possible. Furthermore, given the known catheters, closure of the openings, which prevents application of a fluid, occurs within a short time, for example within a few hours to days, as a result of blood clotting and ingrowth of connective tissue.

DETAILED DESCRIPTION

It is an object of the present invention to at least partially overcome one or more of the disadvantages resulting from the prior art.

In particular, a device for local application of small quantities of pharmaceutical fluids, such as antibiotic solutions, is to be provided with which local and temporary delivery of the pharmaceutical fluid into small-volume, difficult-to-access regions is enabled. The device should thereby be flexibly adaptable to different fields of application. A mechanical stress on the walls of the hollow spaces to be treated is thereby to be avoided to the extent possible. Given use for treating an infection, an optimally gentle treatment should be possible in which adjacent inflamed tissue is irritated as little as possible, namely both upon temporary delivery of the fluid and upon insertion and removal of the introduced part of the device. The device should also be suitable for repeated delivery of the fluid over longer periods at a specific location without the device needing to be removed for this purpose. The device should be inexpensive to manufacture and be an optimally hygienic, disposable product that can only be used once. At least the part of the device that can be placed into the hollow space to be treated, or even the entire device, should thereby be inexpensive and easy to dispose of as a disposable product. At the same time, however, the pharmaceutical fluid should not be able to flow out of the device in an uncontrolled manner. After successful release of the pharmaceutical fluids, the device should be protected, via an automatic sealing of the discharge opening, from closure of the discharge opening, for example due to ingrowth of connective tissue or due to clotted blood. Fluid delivery from the device should be controllable from the outside.

The object of the invention is thus also to develop a simple, cost-effective device for local application of pharmaceutical fluids. The device is intended to enable a local application of, in particular, pharmaceutical fluids of arbitrary composition, for example antibiotic solutions. Given a medical application, after implantation a part of the device is located in the patient and a second part of the device is located outside the patient. It should be possible to introduce The pharmaceutical fluids into the part of the device located outside the patient, and to guide said fluids through the device to the implantation site and release them there. The device should be plastically deformable in order to be able to conform to anatomical conditions at the implantation site or the geometric shape of the hollow shape.

It is a further object of the invention to provide a system with which a locally limited application of small quantities of pharmaceutical fluids is possible, by means of which at least a part of the objects already described is at least partially achieved.

It is a further object of the invention to provide a method with which a locally limited application of small quantities of pharmaceutical fluids is possible, by means of which at least a part of the objects already described is at least partially achieved.

A contribution to at least partial fulfillment of at least one of the aforementioned objects is achieved via the features of the independent claims. The dependent claims provide preferred embodiments that contribute to at least partially fulfilling at least one of the objects.

A first embodiment of the invention is a device for applying a pharmaceutical fluid, comprising a tube and a valve element, wherein the tube can be connected in terms of fluid conduction via a first tube end to a reservoir for the pharmaceutical fluid, and wherein the valve element is arranged in a second tube end of the tube, wherein, at a first valve element end facing toward the first tube end, the valve element has at least one anchoring element in order to prevent the valve element from coming out of the second tube end, has, at a second valve element end facing toward the second tube end, a sealing element with an outer diameter of the sealing element corresponding to at least one inner tube diameter of the tube, so that the second tube end is sealed in terms of fluid conduction by the sealing element, and comprises a conduit means which connect the first tube end and the sealing element in terms of fluid conduction, wherein, upon charging the pharmaceutical fluid with pressure from the direction of the first tube end, a gap can be reversibly formed between the tube and the sealing element so that the second tube end is opened in terms of fluid conduction.

In one embodiment of the device, upon charging the pharmaceutical fluid with at least 5 $N/cm^2$ of pressure from the direction of the first tube end, a gap can be reversibly formed between the tube and the sealing element so that the second tube end is open in terms of fluid conduction. This embodiment is a second embodiment of the invention, which is preferably dependent on the first embodiment of the invention.

In one embodiment of the device, the valve element has a valve element length corresponding to at least three times the outer diameter of the sealing element. This embodiment is a third embodiment of the invention, which is preferably dependent on the first or second embodiment of the invention.

In one embodiment of the device, the at least one anchoring element is at least one barb element. This embodiment is a fourth embodiment of the invention, which is preferably dependent on one of the preceding embodiments of the invention.

In one embodiment of the device, the at least one barb element takes the form of a cone with a cone base and a cone shell, wherein the cone shell faces toward the first valve element end and the cone base faces toward the second valve element end. This embodiment is a fifth embodiment of the invention, which is preferably dependent on the fourth embodiment of the invention.

In one embodiment of the device, the cone base and the cone shell enclose an angle of at most 80°. This embodiment is a sixth embodiment of the invention, which is preferably dependent on the fifth embodiment of the invention.

In one embodiment of the device, the cone is penetrated at least at one location by the conduit means. This embodiment is a seventh embodiment of the invention, which is preferably dependent on the fifth or sixth embodiment of the invention.

In one embodiment of the device, the tube comprises an elastic polymer with a Shore A hardness greater than 50, and/or a thermoplastic polymer with a Shore D hardness greater than 10; the tube in particular consists of an elastic polymer with a Shore A hardness greater than 50, and/or of a thermoplastic polymer with a Shore D hardness greater than 10. This embodiment is an eighth embodiment of the invention, which is preferably dependent on one of the preceding embodiments of the invention.

In one embodiment of the device, the tube comprises an x-ray opacifier. This embodiment is a ninth embodiment of the invention, which is preferably dependent on one of the preceding embodiments of the invention.

In one embodiment of the device, at least one metal coil is arranged along a longitudinal axis of the device within the tube and/or in a wall of the tube. This embodiment is a tenth embodiment of the invention, which is preferably dependent on one of the preceding embodiments of the invention.

In one embodiment of the device, the device has an adapter with which the device and a reservoir for a pharmaceutical fluid can be connected in terms of fluid conduction, preferably in a reversibly fluid-conducting manner. This embodiment is an eleventh embodiment of the invention, which is preferably dependent on one of the preceding embodiments of the invention.

In one embodiment of the device, the device has a check valve within the tube, which check valve is designed to be fluid-impermeable in the direction of the first tube end. This embodiment is a twelfth embodiment of the invention, which is preferably dependent on one of the preceding embodiments of the invention.

A thirteenth embodiment of the invention is a system for applying a pharmaceutical fluid, comprising a reservoir for the pharmaceutical fluid and a device, the device comprising a tube and a valve element, wherein the tube is connectable or is connected in terms of fluid conduction, via a first tube end, to the reservoir for the pharmaceutical fluid, and wherein the valve element is arranged in a second tube end of the tube, wherein the valve element has, at a first valve element end facing toward the first tube end, at least one anchoring element in order to prevent the valve element from coming out of the second tube end, has, at a second valve element end facing toward the second tube end, a sealing element with an outer diameter of the sealing element corresponding to at least one inner diameter of the tube, so that the second tube end is sealed in terms of fluid conduction by the sealing element; and comprises a conduit means connecting the first tube end and the sealing element in terms of fluid conduction, wherein, upon charging the pharmaceutical fluid with pressure from the direction of the first tube end, a gap can be reversibly formed between the tube and the sealing element so that the second tube end is open in terms of fluid conduction.

In one embodiment of the system, the device is a device according to any one of the second to twelfth embodiments of the invention. This is a fourteenth embodiment of the invention, which is preferably dependent on the thirteenth embodiment of the invention.

In one embodiment of the system, the reservoir comprises a conveying means for conveying a pharmaceutical fluid from the reservoir into the first tube end, and for generating the pressure charging on the pharmaceutical fluid from the direction of the first tube end. This is a fifteenth embodiment of the invention, which is preferably dependent on the thirteenth or fourteenth embodiment of the invention.

A sixteenth embodiment of the invention is a method for applying a pharmaceutical fluid with a device comprising a tube and a valve element, wherein the tube can be connected in terms of fluid conduction via a first tube end to a reservoir for the pharmaceutical fluid, and wherein the valve element is arranged in a second tube end of the tube, wherein the valve element has, at a first valve element end facing toward the first tube end, at least one anchoring element in order to prevent the valve element from coming out of the second tube end, has, at a second valve element end facing toward the second tube end, a sealing element with an outer diameter of the sealing element corresponding to at least one inner tube diameter of the tube, so that the second tube end is sealed in terms of fluid conduction by the sealing element, and comprises a conduit means connecting the first tube end and the sealing element in terms of fluid conduction, said method comprising the following steps:

a. connecting, in a fluid-conducting manner, the device to the reservoir for the pharmaceutical fluid,
b. conveying the pharmaceutical fluid from the reservoir via the tube up to the sealing element,
c. building up a pressure of greater than 5 N/cm$^2$ on the pharmaceutical fluid from the direction of the first tube end within the tube,
d. radially expanding the tube in the region of the sealing element via the action of the pressure while forming a gap between the sealing element and the tube,
e. dispensing the pharmaceutical fluid from the gap while reducing the pressure,
f. radially contracting the tube while closing the gap between the sealing element and the tube.

In one embodiment of the method, the device is a device according to any one of the second to twelfth embodiments of the invention. This is a seventeenth embodiment of the invention, which is preferably dependent on the sixteenth embodiment of the invention.

In the present description, range specifications also include the values given as limits. A specification of the type "in the range of X to Y" with respect to a variable A consequently means that A can assume the values X, Y, and values between X and Y. Ranges delimited at one end of the type "up to Y" for a variable A correspond accordingly to a value Y and less than Y.

Some of the described features are linked to the term "substantially." The term "substantially" is to be understood to mean that, under real conditions and manufacturing techniques, a mathematically exact construction of terms, such as "superposition," "perpendicular," "diameter," or "parallelism" can never be given exactly, but rather only within certain manufacturing-related error tolerances. For example, "substantially perpendicular axes" include an angle of 85 degrees to 95 degrees relative to one another, and "substantially equal volumes" encompass a difference of up to 5% by volume. A "device consisting substantially of plastic" comprises, for example, a plastic fraction of ≥95 to ≤100% by weight. A "substantially complete filling of a volume B" comprises, for example, a filling of ≥95 to ≤100% by volume of the total volume of B.

A first subject matter of the invention relates to a device for applying a pharmaceutical fluid, comprising a tube and a valve element, wherein the tube can be connected in terms of fluid conduction via a first tube end to a reservoir for the pharmaceutical fluid, and wherein the valve element is arranged in a second tube end of the tube, wherein, at a first valve element end facing toward the first tube end, the valve element has at least one anchoring element in order to prevent the valve element from coming out of the second tube end, has, at a second valve element end facing toward the second tube end, a sealing element with an outer diameter of the sealing element corresponding to at least one inner tube diameter of the tube, so that the second tube end is sealed in terms of fluid conduction by the sealing element, and comprises a conduit means which connect the first tube end and the sealing element in terms of fluid conduction, wherein, upon charging the pharmaceutical fluid with pressure from the direction of the first tube end, a gap can be reversibly formed between the tube and the sealing element so that the second tube end is opened in terms of fluid conduction.

The valve element seals the second tube end in terms of fluid conduction until such great pressure is exerted, from the direction of the first tube end, on a pharmaceutical fluid that the tube in the region of the second tube end, in particular at the level of the sealing element, expands radially due to an action of the pharmaceutical fluid in such a way that a gap is produced between the tube and the sealing element, through which gap the pharmaceutical fluid can be dispensed from the device. If the pressure charging is less, in particular if this is within the range of normal pressure, the sealing element and a wall, in particular an inner wall, of the tube will interact in such a way that the second tube end is sealed in terms of fluid conduction, and the pharmaceutical fluid cannot be dispensed from the device. The gap thus forms at an internal pressure that is sufficiently high to expand the tube radially, at least at the level of the sealing element. The second tube end is opened in terms of fluid conduction by the gap produced under pressure charging, so that pharmaceutical fluid from the device can be applied in a targeted manner from the device. The gap can thereby form annularly or only partially around the sealing element. The greater the pressure charging, the sooner the gap forms annularly around the sealing element. With decreasing pressure, in particular caused by an application of the fluid out of the device, the tube contracts radially again, whereby the gap is closed. The closing of the gap thereby takes place within a few moments, for example within fractions of a second. An ingrowth of connective tissue and penetration of blood into the device is thereby prevented, which is why the device can be implanted functionally over several days to weeks in the patient's body, and a repeated local application of a pharmaceutical fluid at the desired site in the patient is thereby enabled. A further advantage of the design of the device is that, even if the second tube end were clogged in terms of fluid conduction, for example by connective tissue or clotted blood, this clogging would be remedied by the charging of pressure and the subsequent dispensation of the pharmaceutical fluid under pressure from the device. The design and the mode of operation of the device thus enables a "self-cleaning" of clogging by use of the device.

The device can be operated in at least two ways. In a first way, the pressure charging is executed in a pulsed manner so that, via application of a small quantity of pharmaceutical fluid, for example up to 2 milliliters, out of the device, the internal pressure decreases in such a way that the gap is closed again. The pressure charging thereby reaches the level required to reversibly form the gap only for a short time, i.e., in a pulsed manner. In a further way, a continuous pressure charging on the pharmaceutical fluid takes place so that said fluid can be discharged from the second tube end for as long as the pressure charging is maintained at the required level. This way of pressure charging thus allows a continuous application of the pharmaceutical fluid.

The device comprises a tube. A tube is understood to mean a flexibly deformable hollow body having a wall surrounding an interior space, through which a fluid, in particular a pharmaceutical fluid, can be conveyed from a first tube end that is open in terms of fluid conduction to a second tube end that is open in terms of fluid conduction. The interior space can thereby have differently designed cross-sectional geometries, such as oval or polygonal. Due to the ease of manufacture and use, an essentially round cross-section of the interior space is preferred. In order to enable a controlled application of even small quantities of pharmaceutical fluid, for example up to 2 milliliters, it is preferable that the tube have an inner tube diameter, i.e., the diameter of the interior space, in a range of 0.5 to 3 mm, preferably in a range of 0.8 to 2.5 mm, more preferably of 1 to 2 mm.

The device comprises a valve element. The valve element is arranged at least partially within the second tube end so that the latter is sealed in terms of fluid conduction by the valve element until a sufficiently high pressure is exerted on the pharmaceutical fluid so that the gap is reversibly produced and the pharmaceutical fluid may be applied from the device.

In order to seal the second tube end in terms of fluid conduction, the valve element comprises a sealing element arranged at least partially within the second tube end. The sealing element fills the interior space of the tube at the second tube end in such a way that, without pressure charging, the wall of the tube is sealed in terms of fluid conduction and rests on an outer surface of the sealing element. For this purpose, the sealing element has an outer sealing element diameter corresponding to at least the inner tube diameter of the tube. The tube preferably has a round interior cross-section, which is why the sealing element also preferably has a round cross-section.

If the inner tube diameter and the outer diameter of the sealing element have the same value, in a relaxed, unexpanded state the tube will abut the sealing element so that the second tube end is sealed in terms of fluid conduction.

If the outer diameter of the sealing element is greater than the inner tube diameter, the sealing element expands the tube, in particular the second tube end, so that the tube in an expanded state abuts the sealing element in order to seal the second tube end in terms of fluid conduction. In order to prevent production inaccuracies and material fatigue, it is preferred that the outer diameter of the sealing element be larger than the inner tube diameter. The outer diameter of the sealing element is preferably at least 5%, more preferably at least 10%, most preferably at least 15% larger than the inner tube diameter. In order to prevent tearing of the tube and material fatigue, it is preferred that the sealing element diameter be no more than 30% larger than the inner tube diameter. In addition, the required pressure charging on the pharmaceutical fluid to form the gap increases as the size difference of the outer diameter of the sealing element to the inner tube diameter increases, due to the associated expansion of the second tube end in the initial state without a gap having yet formed, which is why the sealing element diameter is preferably no more than 30% larger than the inner tube diameter. The value specifications are to be understood as meaning that, for example, the specification "the outer diameter of the valve element is 30% larger than the inner tube diameter" means that the outer diameter of the valve element corresponds to 130% of the inner tube diameter.

In order for the valve element to be firmly fastened in the second tube end in such a way that the valve element is prevented from coming out of the second tube end, in particular unintentionally, for example during the course of charging pressure to the pharmaceutical fluid in order to form the gap, the valve element has an anchoring element at a first valve element end. The anchoring element interacts with the wall of the tube in such a way that, after being introduced into the second tube end, the valve element cannot be pulled out or pushed out of the second tube end non-destructively. The first valve element end is to be understood not only as the outer "tip" of the valve element which points in the direction of the first tube end. Rather, when viewed from the direction of the first tube end, the first valve element end extends over $\frac{2}{3}$ of the entire axial extent of the valve element.

The valve element has a conduit means so that the pharmaceutical fluid can travel up to the sealing element at the second valve element end from the direction of the first tube end in order to form the gap there under pressure charging. The conduit means is a fluid-conducting element through which the pharmaceutical fluid can be conveyed from the direction of the first tube end, past the anchoring element, up to the sealing element at the second valve element end. The conduit means ensures that, by charging pressure to the pharmaceutical fluid, the gap is formed in the region of the sealing element and expansion of the tube in the region of the at least one anchoring element does not occur.

The device according to the invention serves for the local application of a pharmaceutical fluid, in particular for the treatment of infected tissue, such as soft and/or bone tissue, over a time period of several days to weeks. A pharmaceutical fluid contains at least one active pharmaceutical ingredient. For example, the pharmaceutical fluid is an aqueous or non-aqueous solution or suspension of active pharmaceutical ingredients.

In one embodiment, the pharmaceutical fluid is solutions containing at least one antibiotic, at least one chemotherapeutic agent, and/or at least one antimycotic agent. In a further embodiment, the pharmaceutical fluids contain at least one disinfecting component.

Furthermore, pharmaceutical fluids also comprise gases, gas mixtures, and solutions of gases in liquids such as water.

The required pressure charging to the pharmaceutical to form the gap between the sealing element and the tube can depend on different factors, such as the material of the tube, the inner tube diameter, the ratio of the sealing element diameter to the inner tube diameter, and the length of the sealing element.

In order to ensure a controlled application of the pharmaceutical fluid from the device, one embodiment of the device is characterized in that a gap between the tube and the sealing element can be reversibly formed only as of a pressure charging of at least 5 N/cm$^2$ to the pharmaceutical fluid from the direction of the first tube end, so that the second tube end is opened in terms of fluid conduction. If the charged pressure does not reach this limit value, the second tube end remains sealed in terms of fluid conduction. This prevents unintentional escape of the pharmaceutical fluid from the tube into the patient, which could entail health risks. In order that an application take place in a controlled manner in small quantities and without the risk of cracking in the tube, it is preferable that the pressure charging to form the gap need be not more than 50 N/cm$^2$.

The valve element has a valve element length. In order to ensure operative application with the device, the valve element length is to be adapted to the outer diameter of the sealing element. The larger the outer diameter of the sealing element, the greater the valve element length is to be selected.

One embodiment of the device is characterized in that the valve element has a valve element length corresponding to at least three times the outer diameter of the sealing element. If the device is shorter, a "tilting" of the valve element within the tube can occur upon charging pressure or already during assembly of the device. The device would thereby not be sealed in terms of fluid conduction at the second tube end. In order to design the device as flexibly as possible, it is preferred that the valve element length corresponds to not more than five times the outer diameter of the sealing element.

Different anchoring elements can be used in order to fasten the valve element securely in the second tube end so that it is does not come out of the second tube end in the course of pressure charging. In a first embodiment, the anchoring element can be a fastening means, such as a screw, which connects the valve element and the tube to one another. In a further embodiment, the anchoring element can be designed as a tongue-and-groove connection between the valve element and the tube, wherein one element has the tongue and the other element has the groove.

One embodiment of the device is characterized in that the at least one anchoring element is at least one barb element. A barb element allows a simple insertion of the valve element into the second tube end, and at the same time effectively prevents the valve element from coming out of the device in the opposite direction. At the same time, a barb element can be realized in a simple and cost-effective manner in terms of production technology. The at least one barb element thereby has a pointed end pointing toward the wall of the tube which, by interaction with the wall, prevents the inserted valve element from being pushed out of the second tube end.

The barb element can have different shapes. In one embodiment, the valve element has at least one hook-shaped curved wire, similar to a fish hook, which fastens the valve element within the tube. In a further embodiment, the valve element has at least one spike or rod projecting obliquely in the direction of the second valve element end, which spike or rod functions as a barb element.

One embodiment of the device is characterized in that the at least one barb element takes the form of a cone with a cone base and a cone shell, wherein the cone shell faces toward the first valve element end and the cone base faces toward the second valve element end. The cone is preferably rotationally symmetrical, wherein the longitudinal axis of the cone and the longitudinal axis of the valve element are preferably congruent. In a longitudinal section through the valve element, the cone is formed as a triangular elevation on a base body of the valve element. In one embodiment, the cone runs completely around the valve element. In a further embodiment, the cone is penetrated at one or more locations.

One embodiment of the device is characterized in that the cone base and the cone shell enclose an angle of at most 80°, preferably of at most 75°, more preferably of at most 70°, most preferably of at most 65°. This allows a secure fastening of the valve element within the second tube end with simultaneously simple insertion of the valve element into the tube.

In order to further reduce the risk of the valve element coming out, it is preferred that at least two anchoring elements, preferably barb elements, be arranged one after another in the axial orientation of the valve element.

The valve element is preferably formed in one piece, wherein the valve element comprises a biocompatible metal, a biocompatible metal alloy, and/or a biocompatible plastic, or consists of one of the aforementioned materials or material combinations. Examples of plastics include polyamides, polyesters, polyketones, polymethacrylates, and copolymers thereof. Examples of metals and metal alloys include stainless steels, such as stainless steel 1.4404, or titanium alloys, such as $TiAl_6V_4$.

In one embodiment, the conduit means extends in the manner of a pipe from the first valve element end in the direction of the second valve element end, where it exits spatially before the sealing element so that the pharmaceutical fluid can be conveyed from the first tube end up to the sealing element, in particular to the contact point of the sealing element and the wall of the tube, in order to form the gap when pressure is charged.

One embodiment of the device is characterized in that the cone is penetrated at least at one location by the conduit means so that the first tube end is connected in terms of fluid conduction via the conduit means, through the cone, to the sealing element. In this embodiment, the conduit means is formed on an outer surface of the valve element, which facilitates production-related manufacturing of the valve element.

The tube can comprise or consist of one or more different materials, insofar as the formation of the gap is possible in a controlled, safe, and reversible manner for the application of a pharmaceutical fluid.

One embodiment of the device is characterized in that the tube comprises an elastic polymer with a Shore A hardness greater than 50 or a thermoplastic polymer with a Shore D hardness greater than 10, in particular in that the tube consists of an elastic polymer with a Shore A hardness greater than 50 or a thermoplastic polymer with a Shore D hardness greater than 10. This enables a safe, controlled, and repeatable application of a pharmaceutical fluid, in particular even in small quantities, such as up to 2 millimeters. For a given inner tube diameter and outer diameter of the sealing element, the pressure charging required to form the gap can be adjusted by selecting the tube material.

In order to monitor a proper and targeted application at the desired site within a patient, one embodiment of the device is characterized in that the tube has an x-ray opacifier. By means of an x-ray opacifier, the correct positioning of the device within the patient can be visualized via imaging methods by means of X-ray radiation. Examples of x-ray opacifiers are barium sulfate, zirconium dioxide, and calcium carbonate.

Due to the flexible deformability of the tube, it is possible by means of the device to apply a pharmaceutical fluid even at locations within the patient that are difficult to access. In addition, the flexibility of the tube allows the patient a largely painless mobility despite the implanted device.

In order to give the device, in particular the tube, a certain stability despite the flexible deformability of the tube, for example in order to facilitate implantation into the patient, it may be preferable to structurally reinforce the tube. In one embodiment, this is done by using one or more wires, in particular one or more metal wires, which are arranged in the wall of the tube and/or in the interior space of the tube, parallel to the longitudinal axis of the tube.

One embodiment of the device is characterized in that at least one metal coil is arranged along a longitudinal axis of the device within the tube and/or in the wall of the tube. In this case, the metal coil and tube have congruent longitudinal axes. The metal coil "wraps around" the interior space of the tube. An advantage of a metal coil is that the flexibility of the device is maintained, and at the same time the device can be bent into a desired shape, for example in order to facilitate implantation into the patient.

The device, in particular the first tube end, is connectable or is connected in different ways in terms of fluid conduction to a reservoir for a pharmaceutical fluid. In a first embodiment, the first tube end can be plugged onto a spout of a reservoir. In a further embodiment, tube and reservoir are connectable or are connected in terms of fluid conduction by means of a threaded connection. In further embodiments, tube and reservoir are connectable or are connected to one another in terms of fluid conduction by means of a flange connection or via a tube connection.

One embodiment of the device is characterized in that the device has an adapter to which the device and a reservoir for a pharmaceutical fluid can be connected in terms of fluid conduction, in particular reversibly in terms of fluid conduction. An advantage of an adapter is that the device can be connected to a plurality of different reservoirs in terms of fluid conduction, independently of the respective embodiment and diameter of the existing fluid outlet at the reservoir.

One embodiment of the device is characterized in that the device has a check valve within the tube, which check valve is in particular arranged between the first tube end and the sealing element and is designed to be fluid-impermeable in the direction of the first tube end. The check valve can prevent a pharmaceutical fluid from flowing back into a reservoir connected in terms of fluid conduction to the device at the second tube end, which prevents contamination of the reservoir.

The check valve can have different designs. In one embodiment, the check valve comprises a non-return flap which allows the pharmaceutical fluid to be conveyed through the tube only in one flow direction, and closes the tube in the opposite flow direction in terms of fluid conduction. In a further embodiment, the check valve has a restoring element, for example a spring, in particular a coil spring, which closes the check valve in the direction of the first tube end in terms of fluid conduction and allows the pharmaceutical fluid to be conveyed through the tube in the opposite direction. In a further embodiment, the check valve is designed as a ball check valve. Due to its high structural robustness, in a further, preferred embodiment the check valve is designed as a poppet check valve.

A further subject matter of the invention relates to a system for applying a pharmaceutical fluid, comprising a device according to any one of the preceding embodiments. In addition to the device, the system comprises a reservoir for the pharmaceutical fluid, wherein the tube of the device is connectable or is connected to the reservoir in terms of fluid conduction via the first tube end.

The term "reservoir" is understood to mean all containers suitable for storing the pharmaceutical fluid. Examples of reservoirs include bags, syringes, pistons, balloons, canisters, and ampoules, wherein bags, balloons, and syringes are preferred.

The pressure charging on the pharmaceutical fluid to form the gap can be exerted in different ways. In one embodiment, the system, in particular the tube of the device, is connected to a separate pump, in particular to a peristaltic pump, which can exert the pressure charging on the pharmaceutical fluid.

One embodiment of the system is characterized in that the reservoir comprises a conveying means for conveying a pharmaceutical fluid from the reservoir into the first tube end, and for generating the pressure charging on the pharmaceutical fluid from the direction of the first tube end. In one embodiment of the system, the reservoir is a syringe and the conveying means is a piston that can be displaced axially in the syringe.

A further subject matter of the invention relates to a method for applying a pharmaceutical fluid to a device according to any one of the preceding embodiments, comprising the following steps:
a. connecting, in a fluid-conducting manner, the device to the reservoir for the pharmaceutical fluid,
b. conveying the pharmaceutical fluid from the reservoir via the tube up to the sealing element,
c. building up a pressure of greater than 5 N/cm$^2$ on the pharmaceutical fluid from the direction of the first tube end within the tube,
d. radially expanding the tube in the region of the sealing element via the action of the pressure while forming a gap between the sealing element and the tube,
e. dispensing the pharmaceutical fluid from the gap while reducing the pressure,
f. radially contracting the tube while closing the gap between sealing element and tube.

The term "reservoir" is understood to mean all containers suitable for storing the pharmaceutical fluid. Examples of reservoirs include bags, syringes, pistons, balloons, canisters, and ampoules, wherein bags, balloons, and syringes are preferred.

In step a., the connection of the device and the reservoir in terms of fluid conduction may take place at different points in time. In one embodiment, the connection occurs immediately before, for example up to 5 minutes before, application of the pharmaceutical fluid into the patient. In a further embodiment, the connection has already taken place long before the application of the pharmaceutical fluid, for example already several days to several months before application of the pharmaceutical fluid. For example, the connection in terms of fluid conduction can have already taken place in the manufacturing of the device.

In step b., the pharmaceutical fluid is conveyed from the reservoir via the tube up to the sealing element, so that the tube is substantially completely filled with the pharmaceutical fluid from the first tube end up to the sealing element. The conveying preferably takes place while exerting a pressure on the pharmaceutical fluid.

In order to convey the pharmaceutical fluid from the device, in particular from the second tube end, and to apply it at a desired location, in step c. a pressure of greater than 5 N/cm² is exerted on the pharmaceutical fluid from the direction of the first tube end in the direction of the sealing element. Such a high pressure in step c. serves to reversibly form a gap between sealing element and tube by expanding the tube. If the pressure is lower, a radial expansion of the tube will not occur, and the second tube end will remain sealed in terms of fluid conduction.

In concert with the formation of the gap, the dispensing of the pharmaceutical fluid from the device occurs in step e. The pressure acting on the pharmaceutical fluid is reduced via the dispensing.

If, due to continued dispensation of the fluid, the pressure acting on the pharmaceutical fluid reaches a value below or equal to 5 N/cm², the tube contracts radially, wherein the previously formed gap and the device at the second tube end are closed again in terms of fluid conduction.

If pressure continues to be exerted on the pharmaceutical fluid from the direction of the first tube end, a further dispensation of the pharmaceutical fluid occurs if the pressure continues to exceed 5 N/cm².

With the described method, it is possible to deliver small volumes of pharmaceutical fluid, for example up to 2 milliliters, locally and in a controlled manner. As soon as the pressure exerted on the pharmaceutical fluid falls below the threshold of 5 N/cm², application will stop within the shortest possible time, for example within one second.

The features disclosed for the device are also disclosed for the system and the method, and vice versa

BRIEF DESCRIPTION OF THE FIGURES

The invention is illustrated by way of example below by means of Figures. The invention is not limited to Figures. Shown are:

FIG. 1 shows a partial, schematic longitudinal section of an exemplary embodiment of a device 100 for applying a pharmaceutical fluid 500. The device 100 comprises a tube 200 (shown only in segments) with a first tube end 210 (not shown) and a second tube end 220 opposite the first tube end 210. FIG. 1 shows the tube 200 in a longitudinal section.

Figure 1:
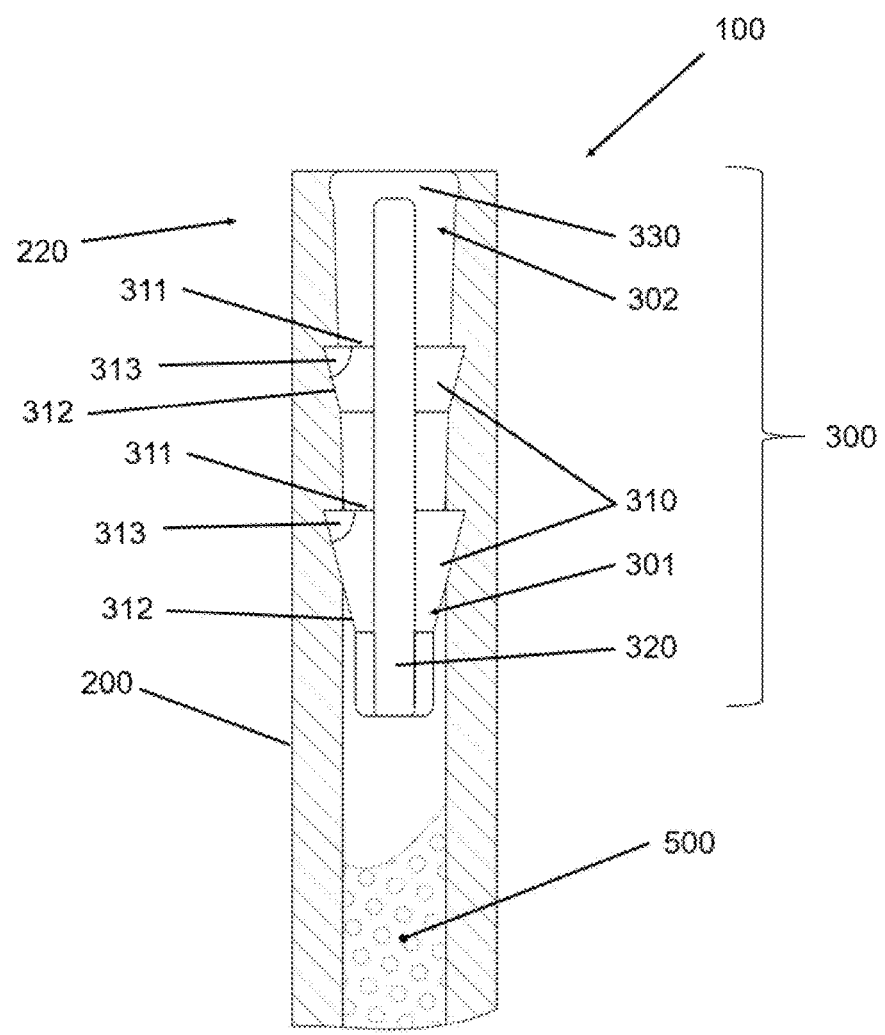
FIG. 1 a partial, schematic longitudinal section of a device for applying a pharmaceutical fluid, comprising a tube and a valve element, FIG. 2 the device from FIG. 1, in a schematic longitudinal section through the valve element, FIG. 3 the device from FIGS. 1 and 2, with pharmaceutical fluid being conveyed, FIG. 4 the device from FIGS. 1 to 3, upon application of the pharmaceutical fluid, FIG. 5 a system for applying a pharmaceutical fluid, and FIG. 6 a method for applying a pharmaceutical fluid.

The device 100 furthermore comprises a valve element 300, shown in a side view, which is arranged within the tube 200, in particular inside the second tube end 220. At a second valve element end 302, the valve element has a sealing element 330 which closes the second tube end 220 in terms of fluid conduction. For this purpose, the sealing element 330 has a sealing element diameter which is (approximately 10%) greater than an inner diameter of the tube. In further embodiments (not shown) of the device 100, the sealing element diameter corresponds to the inner diameter of the tube.

At a first valve element end 301, the valve element 300 has two anchoring elements 310 in the form of conical barb elements, arranged one after another, which interact with a wall of the tube, and prevent the valve element 300 from being driven out of the second tube end 220. For this purpose, the anchoring elements 310 have an acute angle 313 between a cone base 311 and a cone shell 312 so that, although the valve element 300 can simply be inserted into the second tube end 220) in the shown orientation of the valve element 300, it cannot slide out in the opposite direction, i.e., out of the second tube end 220, due to the conical design of the anchoring elements 310 which engage in a barb-like manner in the flexible wall of the tube 200. In order to secure the valve element 300 as reliably as possible against being undesirably driven out of the second tube end 220, the valve element 300 has two anchoring elements 310 situated one after another. In further embodiments (not shown), the valve element 300 has only one anchoring element 310, or three and more anchoring elements 310 situated one after another.

So that the pharmaceutical fluid 500 can be conveyed from the direction of the first tube end 210 up to the sealing element 330, the valve element 300 comprises four conduit means 320, with only one being visible in the shown side view. Two more extend into, and one more extends behind, the drawing plane, and are thus occluded in the side view of the valve element 300. The conduit means 320 penetrate the anchoring elements 310 in the form of a groove and extend along the first valve element end 301, up to the sealing element 330.

Figure 2:
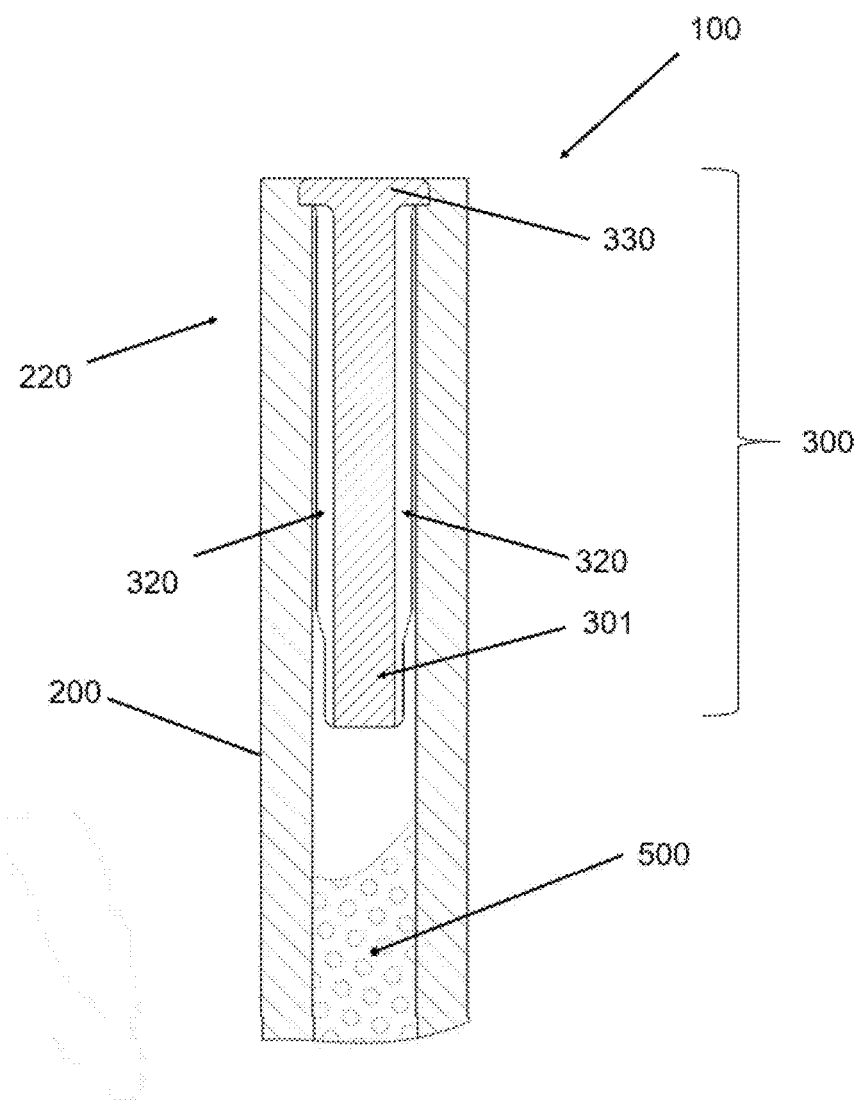

FIG. 2 shows the device 100 of FIG. 1, wherein, in contrast to FIG. 1, the valve element 300 is also shown in longitudinal section in addition to the tube 200. The anchoring means 310 of FIG. 1 are not visible in the shown view, whereas, in contrast to FIG. 1, the conduit means 320 extending along the drawing plane are shown. The conduit means 320 extend via the first valve element end 301 up to the sealing element 330.

Figure 3:
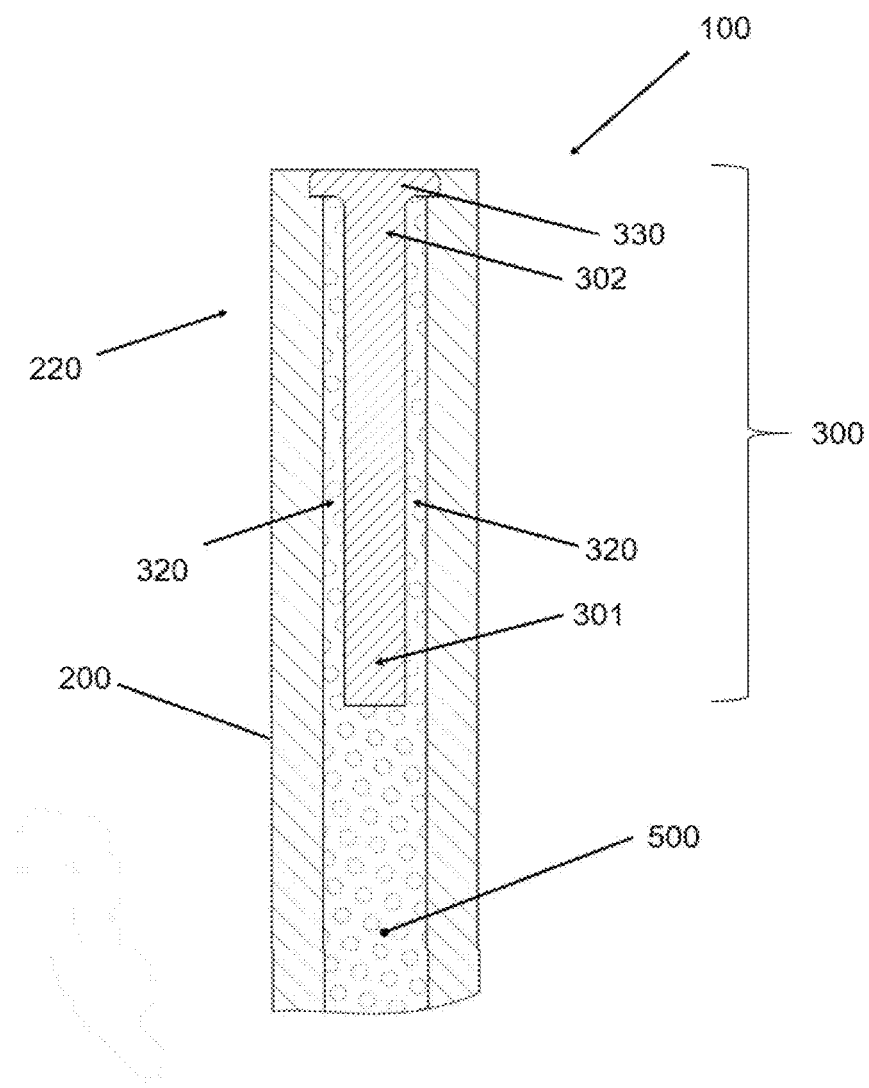

FIG. 3 shows the device 100 of FIGS. 1 and 2, wherein the pharmaceutical fluid 500 extends via the conduit means 320 up to the sealing element 330. The sealing element 330 seals the second tube end 220 in terms of fluid conduction so that the pharmaceutical fluid 500 cannot flow out of the device 100.

Figure 4:
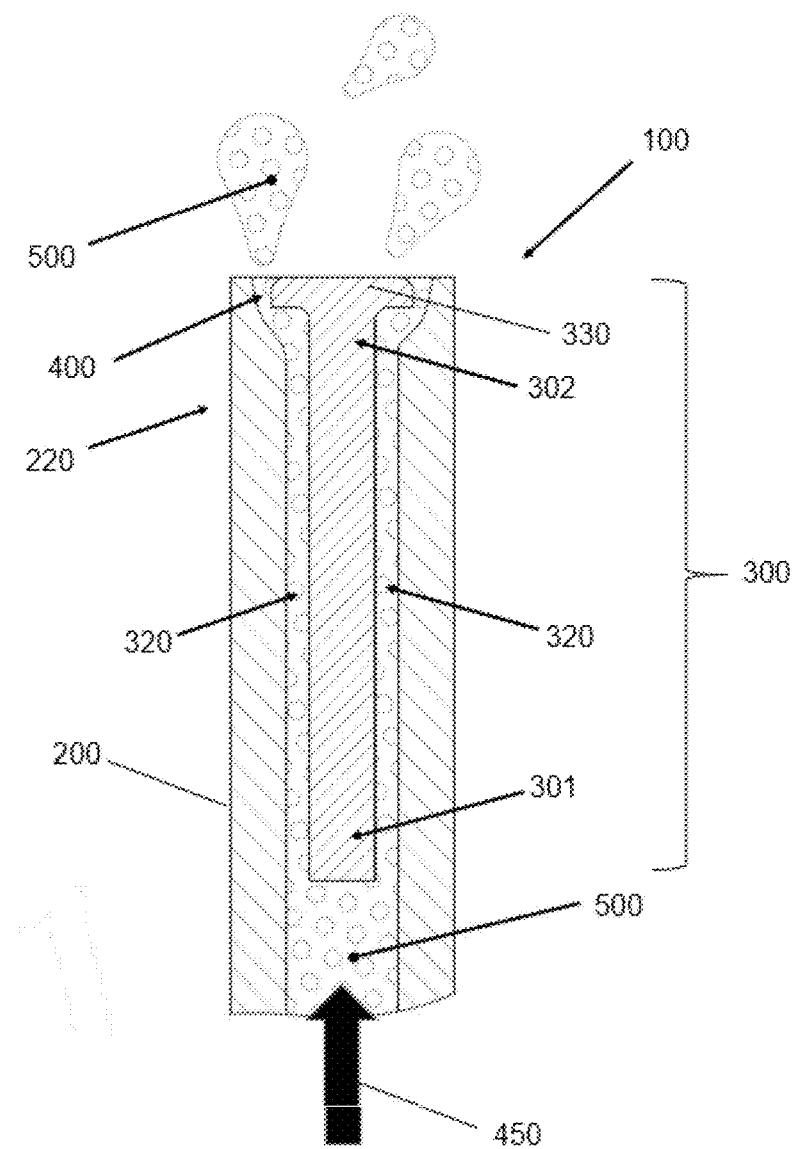

FIG. 4 shows the device 100 of FIGS. 1 to 3, wherein a pressure charging 450) (indicated by an arrow) is exerted on the pharmaceutical fluid 500 from the direction of the first tube end 210. The pressure charging 450) exceeds a limit value of 5 N/cm², so that the tube 200 expands radially in the region of the sealing element 330 at the second tube end 220 while forming a gap 400. In further embodiments, the limit value of the pressure charging 450 is lower or higher than 5 N/cm². Due to the gap 400), the second tube end 220) is open in terms of fluid conduction and the pharmaceutical fluid 500 can be applied to a desired location, in particular in a patient. The gap 400 remains for as long as the pressure charging 450) exceeds the limit value. If the pressure charging 450) falls below the limit value, an instantaneous radially contraction of the second tube end 220 occurs and the tube 200 is again closed by the sealing element 330 in terms of fluid conduction.

FIGS. 1 to 4 thus show an application process of a pharmaceutical fluid 500 by means of the device 100. The application process is repeatable.

Figure 5:
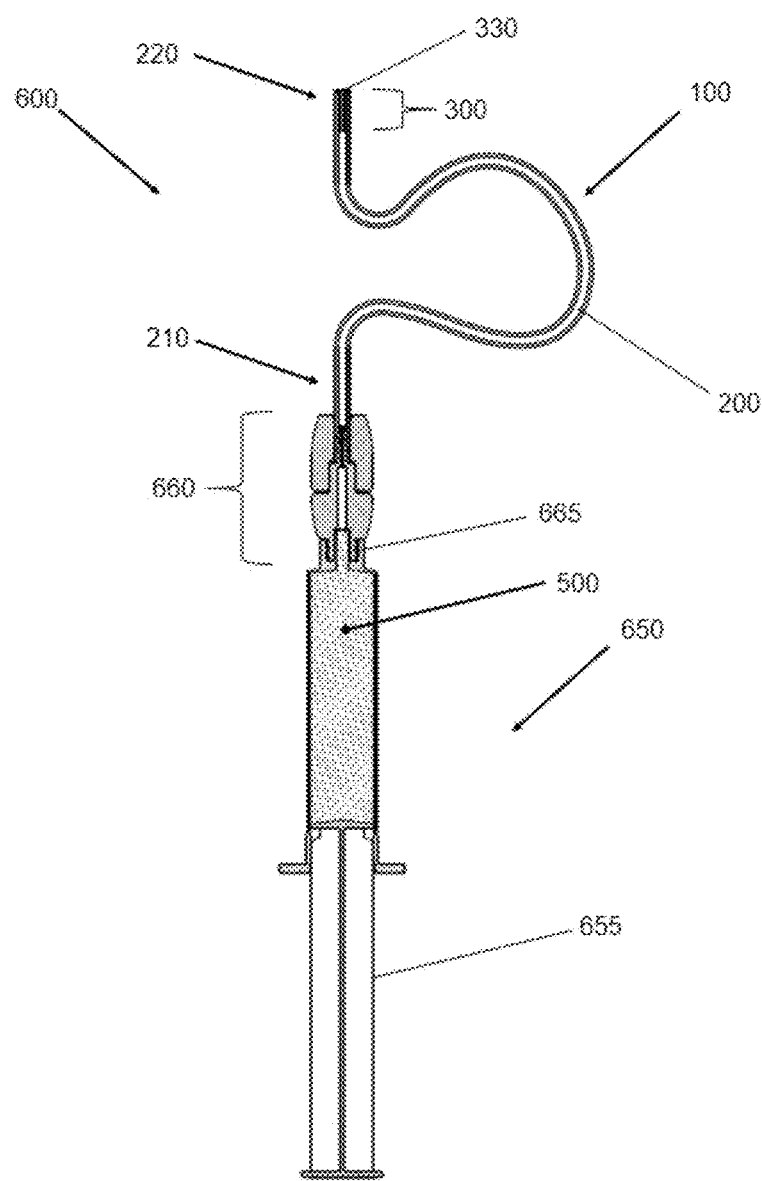

FIG. 5 shows a system 600 for applying a pharmaceutical fluid 500, comprising a reservoir 650 for the pharmaceutical fluid 500, in the form of a syringe, and the device 100 of FIGS. 1 to 4. The device 100) is connected in terms of fluid conduction via the first tube end 210 to the reservoir 650) by means of an adapter 660 having a Luer lock connection 665. In the shown state, the second tube end 220 is sealed by the valve element 300 in terms of fluid conduction. In order to discharge the pharmaceutical fluid 500 from the system 600, a conveying means 655 in the form of a piston can be inserted axially into the reservoir 650, whereby the pharmaceutical fluid 500 is conveyed via the tube 200) up to the valve element 300, in particular the sealing element 330. If the pressure charging reaches the stipulated limit value, a gap (not shown) forms between the tube and the sealing element 330, through which gap the pharmaceutical fluid 500 can be applied to the desired location.

Figure 6:
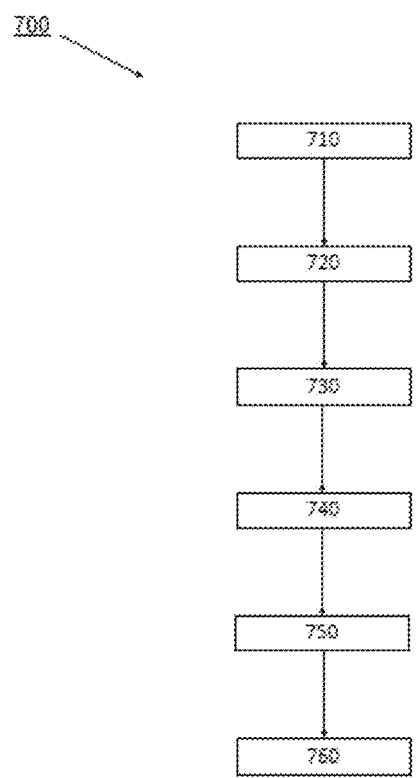

FIG. 6 shows a flow chart of a method for applying a pharmaceutical fluid 500 by means of the device 100, comprising steps 710 to 760. The device 100 comprises the tube 200 and the valve element 300, wherein the tube 200 can be connected in terms of fluid conduction, via the first tube end 210, to a reservoir for the pharmaceutical fluid 500, and wherein the valve element 300 is arranged in the second tube end 220 of the tube 200, wherein the valve element 300 has, at the first valve element end 301 facing toward the first tube end 210, at least one anchoring element 310) in order to prevent the valve element 300 from coming out the second tube end 220, has, at the second valve element end 302 facing toward the second tube end 220, the sealing element 330 having an outer diameter of the sealing element corresponding to at least one inner tube diameter of the tube 200, so that the second tube end 220 is sealed by the sealing element 330 in terms of fluid conduction, and comprises the conduit means 320 which connects 1 the first tube end 210) and the sealing element 330 in terms of fluid conduction.

In step 710), a connection of the device 100 to a reservoir for the pharmaceutical fluid 500 takes place in terms of fluid conduction. The connection in terms of fluid conduction 710 can thereby occur at different points in time. For example, step 710 can take place just shortly, for example 5 minutes, before the device 100 is used, during the manufacturing of the device 100, or at any point in time between these points in time.

In step 720, the pharmaceutical fluid 500 is conveyed from the reservoir via the tube 200 up to the sealing element 330. If the reservoir is, for example, a syringe 650, as shown in FIG. 5, step 720 can be executed by axially inserting a piston 655 associated with the syringe 650).

The valve element 300 seals the second tube end 220 until, in step 730, a pressure of at least 5 N/cm² is exerted on the pharmaceutical fluid 500 from the direction of the first tube end 210.

Upon reaching this limit value of 5 N/cm², in step 740 the tube 200 radially expands in the region of the sealing element 330 while forming a gap 400 between sealing element 330) and tube 200). The second tube end 220 is thereby no longer sealed by the sealing element 330 in terms of fluid conduction. The conveying in step 720) and the buildup of pressure to form the gap 400 in step 740) preferably occur with the same means, for example by axially inserting a piston.

With the formation of the gap 400 in step 740, in step 750 the pharmaceutical fluid 500) is dispensed through the gap 400 from the device 100. The pressure within the device 100) is reduced by the pharmaceutical fluid 500) flowing out of the device 100. If the pressure falls below the limit value of 5 N/cm² due to the dispensing of the fluid 500, the tube will radially contract in step 760, whereby the previously formed gap 400 between sealing element 300 and tube 200 closes again and the second tube end 220 is sealed in a fluid-tight manner. By dispensing the pharmaceutical fluid 500 in step 750), the device 100 thus autonomously closes again provided a pressure of at least 5 N/cm² is not maintained by pressure continuing to be exerted on the pharmaceutical fluid 500, in spite of the dispensing. The device 100 is therefore suitable in particular for the controlled application of a small-volume quantity of pharmaceutical fluid 500, for example up to 2 milliliters. The method can be repeated arbitrarily often.

REFERENCE SIGNS

100 Device
200 Tube
210 First tube end
220 Second tube end
300 Valve element
301 First valve element end
302 Second valve element end
310 Anchoring element
311 Cone base
312 Cone shell
313 Angle between cone base and cone shell
320 Conduit means
330 Sealing element
400 Gap
450 Pressure charging
500 Pharmaceutical fluid
600 System
650 Reservoir
655 Conveying means
660 Adapter
665 Luer lock connection
700 Method
710 Connecting in terms of fluid conduction
720 Conveying
730 Pressure buildup
740 Radial expansion
750 Dispensing
760 Radial contraction

What is claimed is:

1. A device for applying a pharmaceutical fluid, comprising:
a tube; and,
a valve element;

wherein the tube can be connected in terms of fluid conduction via a first tube end to a reservoir for the pharmaceutical fluid, and wherein the valve element is arranged in a second tube end of the tube; wherein the second tube end comprises a terminal opening;

wherein the valve element has at a first valve element end facing toward the first tube end, at least one anchoring element in order to prevent the valve element from being discharged from the second tube end has at a second valve element end facing toward the second tube end, a sealing element having an outer diameter of the sealing element corresponding to at least one inner tube diameter of the tube, such that the sealing element is configured to fluid-tightly close the terminal opening of the second tube end so that the second tube end is sealed by the sealing element in terms of fluid conduction, and comprises a conduit means connecting the first tube end and the sealing element in terms of fluid conduction;

wherein a gap can be reversibly formed between the tube and the sealing element when a pressure is charged to the pharmaceutical fluid from a direction of the first tube end, so that the second tube end is open in terms of fluid conduction.

2. The device according to claim 1 wherein the gap between the tube and the sealing element can be reversibly formed given a pressure charging of at least 5 N/cm$^2$ to the pharmaceutical fluid from the direction of the first tube end, so that the second tube end is open in terms of fluid conduction.

3. The device according to claim 1 wherein the valve element has a valve element length corresponding to at least three times the outer diameter of the sealing element.

4. The device according to claim 1 wherein the at least one anchoring element is at least one barb element.

5. The device according to claim 4 wherein the at least one barb element takes the form of a cone having a cone base and a cone shell; wherein the cone shell faces toward the first valve element end and the cone base faces toward the second valve element end.

6. The device according to claim 5 wherein the cone base and the cone shell enclose an angle of at most 80°.

7. The device according to claim 5 wherein the cone is penetrated at least at one location by the conduit mean.

8. The device according to claim 1 wherein the tube comprises an elastic polymer with a Shore A hardness greater than 50 and/or a thermoplastic polymer with a Shore D hardness greater than 10.

9. The device according to claim 1 wherein the tube has an x-ray opacifier.

10. The device according to claim 1 wherein at least one metal coil is arranged along a longitudinal axis of the device within the tube and/or in a wall of the tube.

11. The device according to claim 1 wherein the device has an adapter to which the device and the reservoir for a pharmaceutical fluid can be reversibly connected in terms of fluid conduction.

12. The device according to claim 1 wherein the device has a check valve within the tube, which wherein the check valve is designed to be fluid-impermeable in the direction of the first tube end.

13. A system for applying a pharmaceutical fluid, comprising:
a reservoir for the pharmaceutical fluid; and,
a device comprising:
  a tube; and,
  a valve element,
  wherein the tube can be connected in terms of fluid conduction via a first tube end to the reservoir for the pharmaceutical fluid; and,
  wherein the valve element is arranged in a second tube end of the tube, wherein the second tube end comprises a terminal opening;
  wherein the valve element has at a first valve element end facing toward the first tube end, at least one anchoring element in order to prevent the valve element from being discharged from the second tube end has at a second valve element end facing toward the second tube end, a sealing element with an outer diameter of the sealing element corresponding to at least one inner tube diameter of the tube, such that the sealing element is configured to fluid tightly close the terminal opening of the second tube end so that the second tube end is sealed in terms of fluid conduction by the sealing element, and comprises a conduit means connecting in terms of fluid conduction the first tube end and the sealing element;
  wherein, when pressure is charged to the pharmaceutical fluid from a direction of the first tube end, a gap can be reversibly formed between the tube and the sealing element so that the second tube end is open in terms of fluid conduction.

14. The system according to claim 13,
wherein the reservoir comprises:
a conveying means for conveying a pharmaceutical fluid from the reservoir into the first tube end and for generating the pressure charging to the pharmaceutical fluid from the direction of the first tube end.

15. A method for applying a pharmaceutical fluid with a device comprising:
a tube and a valve element,
wherein the tube can be connected in terms of fluid conduction via a first tube end to a reservoir for the pharmaceutical fluid; and,
wherein the valve element is arranged in a second tube end of the tube, wherein the second tube end comprises a terminal opening;
wherein the valve element has at a first valve element end facing toward the first tube end, at least one anchoring element in order to prevent the valve element from being discharged from the second tube end has at a second valve element end facing toward the second tube end, a sealing element having an outer diameter of the sealing element corresponding to at least one inner tube diameter of the tube, such that the sealing element is configured to fluid-tightly close the terminal opening of the second tube end so that the second tube end is sealed by the sealing element in terms of fluid conduction; and comprises:
a conduit means connecting the first tube end and the sealing element in terms of fluid conduction, comprising the following steps:
  a. connecting, in terms of fluid conduction, the device to the reservoir for the pharmaceutical fluid;
  b. conveying the pharmaceutical fluid from the reservoir via the tube up to the sealing element;
  c. building up a pressure of greater than 5 N/cm$^2$ on the pharmaceutical fluid from the direction of the first tube end within the tube;
  d. radially expanding the tube in the region of the sealing element by the action of the pressure while forming a gap between the sealing element and the tube;

e. dispensing the pharmaceutical fluid from the gap while reducing the pressure;

f. radially contracting the tube while closing the gap between the sealing element and the tube.

\* \* \* \* \*